May 6, 1952 M. EPSTEIN 2,595,782
PLANT MEDIUM WATERING DEVICE
Filed May 10, 1949
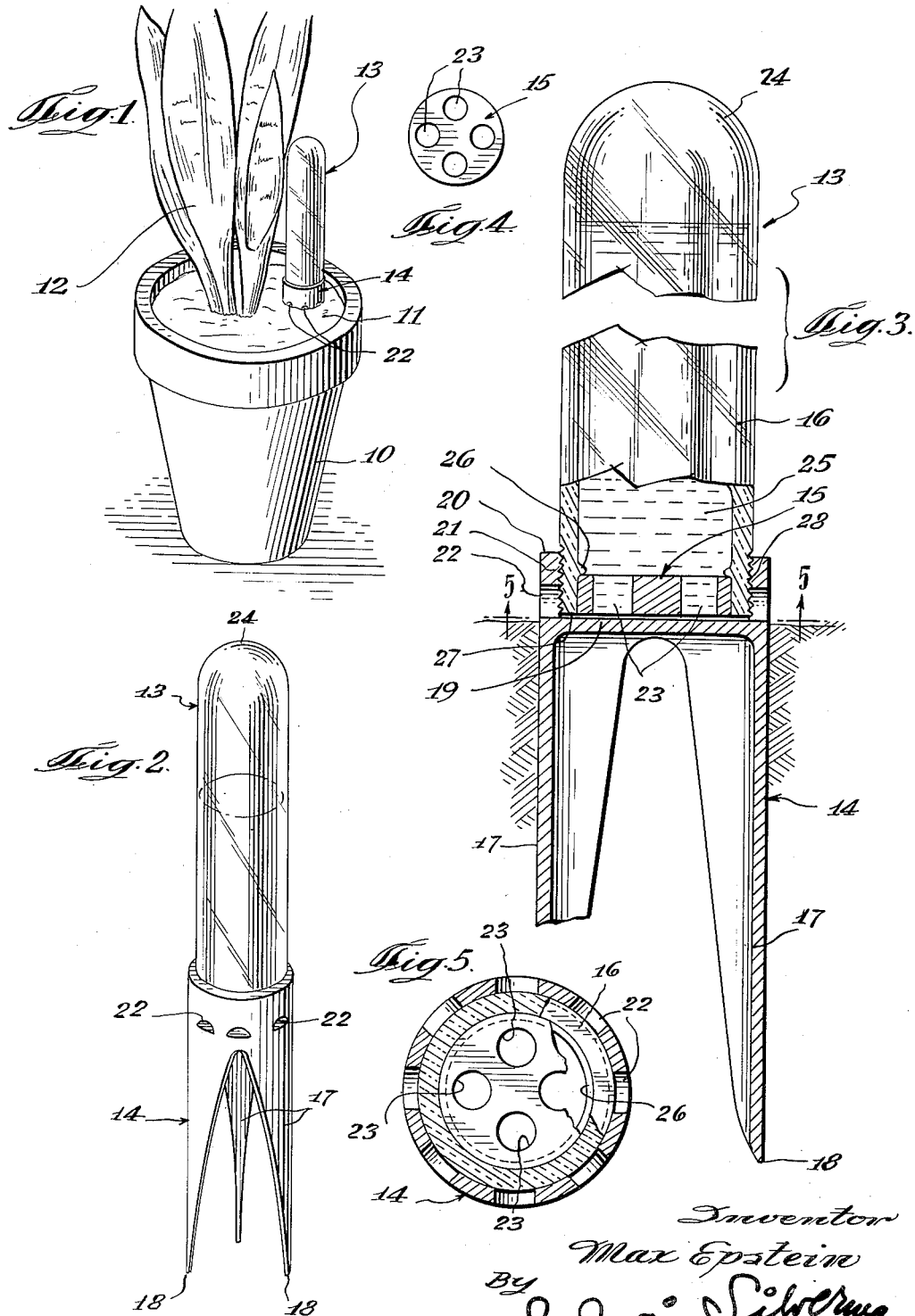

Patented May 6, 1952

2,595,782

UNITED STATES PATENT OFFICE 2,595,782

PLANT MEDIUM WATERING DEVICE

Max Epstein, Millston, Wis.

Application May 10, 1949, Serial No. 92,416

1 Claim. (Cl. 47—48.5)

This invention relates to a reservoir adapted to be installed in a flower pot or other vessel in order to supply water to the growing medium contained in said flower pot over an extended period of time.

Specifically this device is an improvement over an invention described in my co-pending application for United States Letters Patent, Serial No. 79,193, filed March 2, 1949, now abandoned, for a Self-Watering Plant Vessel.

In my said co-pending application there was provided a reservoir associated with the bottom wall of the vessel so that in order to fill the reservoir it was necessary to invert the vessel. My new invention is characterized by the fact that the reservoir is associated with a platform having tines which can be inserted into the growing medium of any flower pot or vessel whereby the reservoir can be removed and filled without disturbing the flower pot.

The objects of my invention are identical to the objects of my co-pending application but in addition a further object is to provide a readily portable reservoir which can be filled in a simple manner and installed in any common plant growing vessel.

Other objects will appear as the description proceeds.

There is illustrated a preferred embodiment in which:

Fig. 1 is a perspective view of a flower pot having a growing medium and a plant therein and having my new watering device placed in the growing medium.

Fig. 2 is an enlarged perspective view of the device removed from the growing medium.

Fig. 3 is a sectional view taken through the device to show the construction thereof.

Fig. 4 is a bottom plan view of the plug contained on the end of my device.

Fig. 5 is a sectional view taken through the device along the line 5—5 of Fig. 3 in the indicated direction.

Referring now to the figures, the reference character 10 designates a flower pot having a growing medium 11 such as loam, or sphagnum moss contained therein. The reference character 12 designates a plant or group of plants growing in said medium.

My improved device is designated 13 and is shown inserted into the top of the growing medium 11 in order to water the same over an extended period of time.

The device 13 consists of three parts, a base member 14, a plug member 15 and a reservoir 16.

All of said members may be formed of any water impervious material such as for example, pottery, plastic, metal or glass.

Base 14 includes a plurality of elongated legs or tines 17, having sharpened ends 18 adapted to be inserted into the growing medium 11. At its upper end the base member 14 is provided with a platform 19 which is imperforate and which has an upstanding annular wall 20 provided upon the top thereof. Said wall is circular in formation and has its inner surface 21 provided with a screw thread for a purpose presently to be described. Said wall 20 is provided with passageways 22 which communicate with the interior of said wall and which are so arranged as to permit any moisture collecting upon the upper surface of the platform 19 to escape from within the confines of the upstanding wall 20. As shown, said passageways 22 are semi-circular but my invention is not limited to such formation.

The plug member 15 consists of a circular disc having a plurality of openings 23 extending therethrough, said plug is adapted to be inserted and frictionally engaged within the end of the reservoir 16 as will be hereinafter pointed out.

The reservoir 16 has a closed rounded upper end 24 and is hollow throughout in order to permit same to retain a quantity of water 25. Spaced from its open end there is provided an annular ridge 26 so that when the plug member 15 is inserted into the open end of the reservoir 16, its movement thereinto will be limited. It is preferred that the bottom surface of the plug member 15 be substantially flush with the end 27 of the reservoir 16 when assembled thereto.

The outer surface of the lower end of the reservoir 16 is threaded as shown at 28, in order to enable the same to cooperate with the threaded interior 21 of the upstanding wall 20.

The device operates in the following manner:

First the reservoir 16 is unscrewed from the upstanding wall 20 and is inverted and filled with water. The base member 14 is now assembled to the reservoir 16 in an inverted position and the reservoir is tightly screwed down so that only a minimum amount of seepage is allowed.

After this, the device 13 is erected and pushed down into the growing medium 11 so that its tines 17 enter said medium and support the device. Thereafter the reservoir 16 may be unscrewed a small amount to permit seepage of water from the reservoir to leave by way of the passageways 22 thereby watering the plant 12 over an extended period of time.

It is believed that this invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of this invention as defined in the appended claim.

What is claimed and desired to be secured by Letters Patent of the United States is:

A device for watering a growing medium over an extended period of time comprising a base member having a plurality of elongate tines on one end thereof adapted removably to be inserted into said medium and an imperforate platform on the other end, an upstanding annular ring surrounding said platform, a cylindrical water reservoir removably mounted within said ring and having its upper end closed off and its lower end open, an annular ridge on said reservoir spaced above said open end, a perforated circular plug member inserted completely into said open end engaging against said ridge, the perforations being of a size to prevent substantial loss of water, said reservoir being movable vertically to permit adjustment of the height of said open end above the platform, said ring having passageways enabling water passing from the reservoir through the plug to flow from the interior of the ring onto said growing medium.

MAX EPSTEIN.

REFERENCES CITED

The following references are of record in the file of this patent:

UNITED STATES PATENTS

| Number | Name | Date |
|---|---|---|
| D. 50,279 | Mohr | Feb. 6, 1917 |
| 727,597 | Day | May 12, 1903 |
| 1,591,845 | Kurtz | July 6, 1926 |
| 1,635,498 | Pershing | July 12, 1927 |
| 1,732,279 | Reimers | Oct. 22, 1929 |